United States Patent Office 2,779,208
Patented Jan. 29, 1957

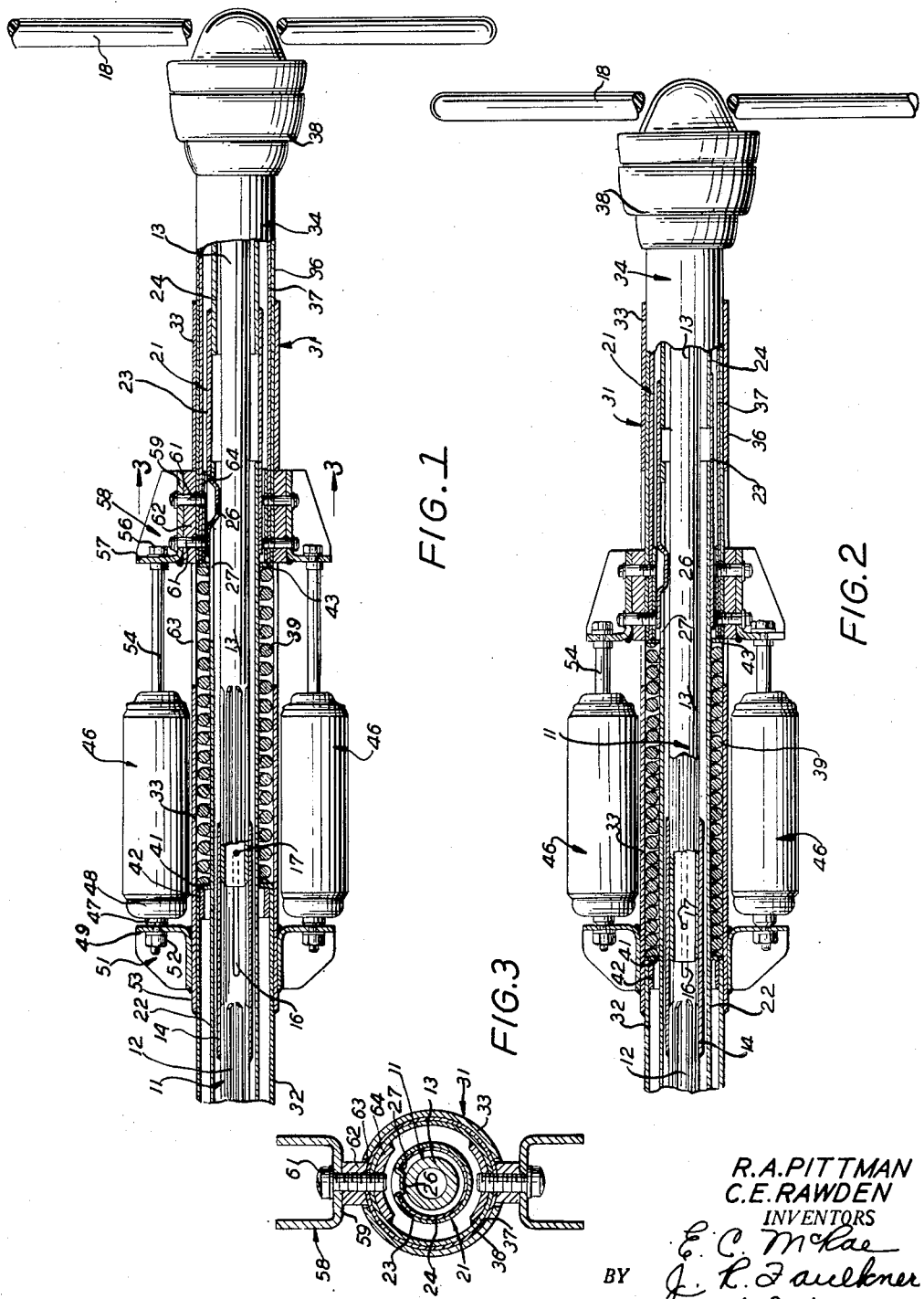

2,779,208
VEHICLE STEERING MECHANISM
Raymond A. Pittman, Ann Arbor, and Cecil E. Rawden, Detroit, Mich., assignors to Ford Motor Company, Dearborn, Mich., a corporation of Delaware
Application July 23, 1953, Serial No. 369,906
5 Claims. (Cl. 74—493)

This invention relates generally to steering mechanism for motor vehicles, and particularly to a collapsible steering wheel of the safety type.

In many high speed motor vehicle accidents the driver is thrown against the steering wheel with such force as to cause injuries. This is particularly true in collisions in which the vehicle strikes a fixed object or an oncoming vehicle. It is known, however, that the human body is capable of withstanding considerable deceleration without ill effects providing a certain amount of movement is permitted before the body is brought to a complete stop. Accordingly, it is an object of the present invention to provide steering wheel mechanism for a motor vehicle in which the steering column and steering shaft are telescopically arranged so that upon impact the steering wheel may move forwardly. Spring means are utilized between the telescoping portions of the mechanism to cushion and gradually bring the steering wheel to a stop within the range of travel permitted. Due to the magnitude of the forces involved, the spring means must be relatively strong, and the rebound or recoil stroke of the spring would tend to extend the telescopic mechanism with considerable force after the compression stroke had been completed. To prevent injury to the driver as a result of this rebound stroke, shock absorbers are interconnected between the telescopically arranged portions of the mechanism to retard the rebound stroke and limit it to a safe value.

A further object of the invention is to provide mechanism of this type which can be incorporated in conventional type steering mechanism with a minimum of additional cost and which will not interfere with normal operations.

Other objects and advantages of this invention will be made more apparent as this description proceeds, particularly when considered in connection with the accompanying drawings, wherein:

Figure 1 is a longitudinal cross-sectional view through vehicle steering mechanism of the present invention, shown in its normal operating relationship.

Figure 2 is a cross-sectional view similar to Figure 1 but showing the collapsed position the mechanism would assume after receiving the impact load.

Figure 3 is an enlarged transverse cross-sectional view taken on the plane indicated by the line 3—3 of Figure 1.

Referring now to the drawing, and particularly to Figure 1, there is shown a steering gear shaft 11 for a motor vehicle comprising lower and upper sections 12 and 13 respectively and an intermediate sleeve 14. The lower section 12 of the steering gear shaft is externally splined to receive the internally splined intermediate sleeve 14. The sleeve 14 is welded to the lower section 12 to prevent axial movement therebetween. The lower portion of the upper steering gear shaft section 13 is also externally splined and is slidably received within the internally splined intermediate sleeve 14. The sleeve 14 is provided with an axially extended elongated slot 16 slidably receiving a pin 17 extending through the slot and mounted in the lower end of the upper section 13 of the steering gear shaft. It will be apparent from the foregoing that the upper section 13 is mounted for telescopic movement in an axial direction relative to the lower section 12 and that the range of telescopic movement is limited by the slot 16 and pin 17. Although telescopically connected, the upper and lower sections of the steering gear shaft are non-rotatably mounted relative to each other so that the steering wheel 18 connected to the upper end of the upper section of the steering gear shaft transmits rotative force to conventional steering gear mechanism (not shown) connected to the lower end of the lower section 12 of the steering gear shaft.

Concentrically surrounding the steering gear shaft 11 is a shifter sleeve indicated by the reference character 21. The shifter sleeve assembly 21 comprises a lower sleeve 22, and intermediate sleeve 23 and an upper sleeve 24. The lower end of the lower sleeve 22 is connected to the vehicle transmission (not shown) in the conventional manner in order to effect shifts between various speed ratios, while the upper end of the upper sleeve 24 is connected to a steering column gear shift (not shown) for manual operation in the conventional manner.

The intermediate sleeve 23 of the shifter sleeve assembly 21 is welded to the lower end of the upper sleeve 24, and slidably embraces the adjacent end of the lower sleeve 22 to accommodate the necessary telescopic movement between the upper and lower sections as the entire steering mechanism is collapsed or extended. To provide for the transmittal of rotative effort through the shifter sleeve assembly the intermediate sleeve 23 is formed with a radially inwardly deformed axially extending rib 26 slidably received within the elongated slot 27 formed in the lower sleeve 22.

Concentrically surrounding the steering gear shaft 11 and the shifter sleeve 21 is a telescopic steering column assembly indicated generally by the reference character 31. The steering column assembly 31 comprises a lower section 32, an intermediate section 33 embracing and secured to the upper end of the lower section 32 by welding, and an upper section 34 slidably received within the upper portion of the intermediate section 33. The upper section 34 comprises an outer sleeve 36 and an inner reinforcing sleeve 37. The upper section 34 supports at its upper end the hub 38, which is conventional in construction and which rotatably supports the steering wheel 18 secured to the upper end of the upper section 13 of the steering gear shaft 11.

A coil spring 39 is provided to yieldably resist the downward telescopic movement of the upper section 34 of the steering column relative to the lower section 32 and the intermediate section 33. The coil spring 39 is a relatively strong spring, and is contained within the annular space between the intermediate section 33 of the steering column and the lower sleeve 22 of the shifter sleeve assembly. The lower end of the coil spring 39 is anchored against an annular ring 41 abutting the end of the lower steering column section 32. The annular ring 41 is reinforced by a short sleeve 42 within the section 32 of the steering column.

At its upper end, the coil spring 39 abuts an annular ring 43 which in turn abuts the lower ends of the inner and outer sleeves 36 and 37 forming the upper section 34 of the steering column.

Consequently it will be seen that telescopic movement is permitted between the parts of the steering gear shaft 11, shifter sleeve assembly 21, and steering column assembly 31, and that this telescopic movement is resisted and cushioned by the coil spring 39. As a result, during a collision or accident in which the driver is thrown against the steering wheel 18, the possibility of injury is lessened by reason of the downward movement of the steering wheel 18 permitted by the telescopic constructions described. The deceleration of the driver's body through the range of telescopic movement permitted and under the control of the coil spring 39 affords protection against injury.

A pair of conventional direct acting tubular shock absorbers 46 are located on opposite sides of the steering column assembly 31 and are interconnected between the upper and lower sections 34 and 32 respectively of the steering column assembly so as to dampen and control the rebound of the coil spring 39 to prevent injury to the driver as a result thereof. If desired only one shock absorber can be provided, although two are preferable to balance the forces in the assembly. Since the mountings are identical only one will be described in detail.

As seen in Figures 1 and 2, the conventional stud 47 projecting from the lower end of the shock absorber cylinder 48 is connected to the radially extending flange 49 of a mounting bracket 51 by means of a bolt 52. The axially extending flange 53 of the mounting bracket is welded to the lower end of the intermediate sleeve 33 of the steering column assembly 31. The sleeve 33 is, as hereinbefore described, welded to the lower section 32 of the steering column.

A piston rod 54 projects from the upper end of the shock absorber cylinder 48 and is secured by a nut 56 to the radially extending flange 57 of an upper mounting bracket 58. The axially extending flange 59 of the upper bracket 58 is secured to the lower end of the inner and outer sleeves 37 and 36 respectively of the upper steering column section 34 by means of bolts 61.

The upper mounting bracket 58 is spaced from the upper steering column section 34 by means of a shoe 62 which extends through an elongated slot 63 in the intermediate section 33 of the steering column assembly. The bolts 61 project through the shoe 62 and the inner and outer sleeves of the steering column section 34 and are threadedly received within a tapped plate 64 located concentrically within the inner sleeve 37 of the steering column. It will thus be seen that the bracket 58 is rigidly connected to the upper section 34 of the steering column so as to be movable therewith as the upper section of the steering column telescopes within the intermediate section 33 thereof. The sliding engagement between the shoe 62 and the slot 63 in the intermediate steering column section 33 prevents relative rotation between the sections of the steering column and also limits the axial movement therebetween.

The other shock absorber 46 is similarly connected to the sections of the steering column and the two shock absorbers are located diametrically opposite each other so as to balance the forces applied to the steering column.

Figure 2 illustrates the relative positions of the parts of the mechanism after an impact load has been applied to the steering wheel 18. It will be seen that the upper section 34 of the steering column assembly has slidably moved downwardly into the intermediate section of the steering column, compressing the coil spring 39 and simultaneously moving the piston rod 54 of the shock absorber 46 into the shock absorber cylinder 48. At the same time telescopic movement has taken place between the sections of the shifter sleeve assembly 21 and the steering gear shaft 11. The return of the compressed coil spring 39 from the position shown in Figure 2 to the normal position shown in Figure 1 is retarded by reason of the shock absorbers 46 so as to prevent the possibility of injury to the driver during the rebound portion of the cycle.

It will be understood that the invention is not to be limited to the exact construction shown and described, but that various changes and modifications may be made without departing from the spirit and scope of the invention, as defined in the appended claims.

What is claimed is:

1. Steering mechanism for a motor vehicle comprising a hollow steering column having upper and lower sections telescopically connected to each other, a hub at the upper end of said upper steering section, a steering shaft within said steering column having upper and lower sections telescopically but non-rotatably connected together, a steering wheel adjacent said hub connected to said upper steering shaft section, a coil spring between the upper and lower sections of said steering column arranged to be compressed during telescopic movement of the upper and lower sections of said steering column toward each other, a tubular telescopic shock absorber adjacent said steering column and parallel thereto, a bracket supporting one end of said shock absorber and mounted upon one of said steering column sections, and a bracket supporting the other end of said shock absorber and connected to the other of said steering column sections to dampen the rebound of said coil spring.

2. The structure defined by claim 1 which is further characterized in that one of said steering column sections has an axially extending slot formed therein, the bracket connecting the other steering column section to one end of the shock absorber extending through said slot.

3. Steering mechanism for a motor vehicle, comprising a steering column having upper and lower sections telescopically connected to each other for relative axial sliding movement therebetween, a steering shaft arranged concentrically within said steering column and having upper and lower sections telescopically but non-rotatably connected to each other for relative axial sliding movement therebetween, a steering wheel connected to the upper end of said upper steering shaft section, a coil spring between said steering shaft and said steering column with its opposite ends abutting portions of said upper and lower steering column sections to resist telescopic movement between said sections toward each other, and a pair of tubular shock absorbers on opposite sides of said steering column said shock absorbers being connected at their opposite ends to the upper and lower sections of said steering column respectively to dampen the rebound stroke between said upper and lower steering column sections following the compression of said coil spring.

4. The construction defined by claim 1 which is further characterized in that one of said steering column sections is provided with an axially extending slot therein, a member slidably mounted within said slot and projecting outwardly beyond the other periphery of said last mentioned steering column section, the bracket supporting one end of said shock absorber being connected to the outer portion of said member, and means connecting the inner portion of said member to the other of said steering column sections.

5. Steering mechanism for a motor vehicle comprising a hollow steering column having upper and lower sections telescopically connected to each other, a hub at the upper end of said upper section, a steering shaft within said steering column having upper and lower sections telescopically but non-rotatably connected together, a steering wheel adjacent said hub connected to said upper steering shaft section, a coil spring operatively connected between one of said upper and one said lower sections for compression during telescopic movement of said upper and lower steering column and steering shaft sections toward each other to cushion downward shock loads upon said steering wheel, and a hydraulic rebound shock absorber operatively connected between one of said lower and one of said upper sections to dampen telescopic movement of said upper and lower sections away from each other to cushion the upward movement of said steering wheel resulting from the rebound of said coil spring following a downward shock load upon said steering wheel.

References Cited in the file of this patent
UNITED STATES PATENTS

| 2,227,821 | Burrell | Jan. 7, 1941 |
| 2,511,165 | Lyman | June 13, 1950 |
| 2,639,626 | Snyder | May 26, 1953 |